United States Patent
Borusu et al.

(10) Patent No.: US 11,820,316 B2
(45) Date of Patent: Nov. 21, 2023

(54) AIRBAG CUSHION WITH FLEXIBLE DIFFUSOR- AND TETHER ARRANGEMENT AND METHOD FOR ITS PRODUCTION

(71) Applicant: Autoliv Development AB, Vargarda (SE)

(72) Inventors: Naga Borusu, Dachau (DE); Martyna Maciejewska, Olawa (PL)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 17/650,345

(22) Filed: Feb. 8, 2022

(65) Prior Publication Data
US 2022/0250574 A1    Aug. 11, 2022

(30) Foreign Application Priority Data
Feb. 11, 2021 (DE) .......................... 102021103218.0

(51) Int. Cl.
*B60R 21/2338* (2011.01)
*B60R 21/2346* (2011.01)
*B60R 21/203* (2006.01)
*B60R 21/217* (2011.01)
*B60R 21/231* (2011.01)
*B60R 21/235* (2006.01)

(52) U.S. Cl.
CPC .......... *B60R 21/217* (2013.01); *B60R 21/203* (2013.01); *B60R 21/2338* (2013.01); *B60R 21/2346* (2013.01); *B60R 2021/23115* (2013.01); *B60R 2021/23382* (2013.01); *B60R 2021/23542* (2013.01)

(58) Field of Classification Search
CPC . B60R 21/217; B60R 21/203; B60R 21/2338; B60R 21/2346; B60R 2021/23382; B60R 2021/23542
USPC ...................................... 280/731, 740, 743.2
See application file for complete search history.

(56) References Cited

U.S. PATENT DOCUMENTS

| 8,517,415 | B2 * | 8/2013 | Iida ....................... B60R 21/237 |
| | | | 280/743.1 |
| 8,925,962 | B2 | 1/2015 | Yamada |
| 9,771,050 | B1 * | 9/2017 | Jamison ............ B60R 21/21656 |

FOREIGN PATENT DOCUMENTS

JP    2002166819 A    6/2002

OTHER PUBLICATIONS

JP 2002166819A—Machine Translation (16 pgs).

* cited by examiner

*Primary Examiner* — Keith J Frisby
(74) *Attorney, Agent, or Firm* — Matthew D. Thayne; Thayne and Davis LLC

(57) ABSTRACT

An airbag cushion comprising a back panel having an inflator opening, a front panel connected to the back panel by an edge connection, and a flexible diffusor- and tether arrangement having a diffusing function and tethering function. The diffusor section spans over the inflator opening and is connected with the back panel via a back panel connection having a first and second end point, such that the diffusor section has a first outlet region extending between the first and second end point and the back panel has a first outlet region extending between the first and second end point, such that a first gas outlet is formed between the first outlet region of the diffusor section and the first outlet region of the back panel. The tether section extends from a first end region connected to the diffusor section to a second end region connected to the front panel.

14 Claims, 8 Drawing Sheets

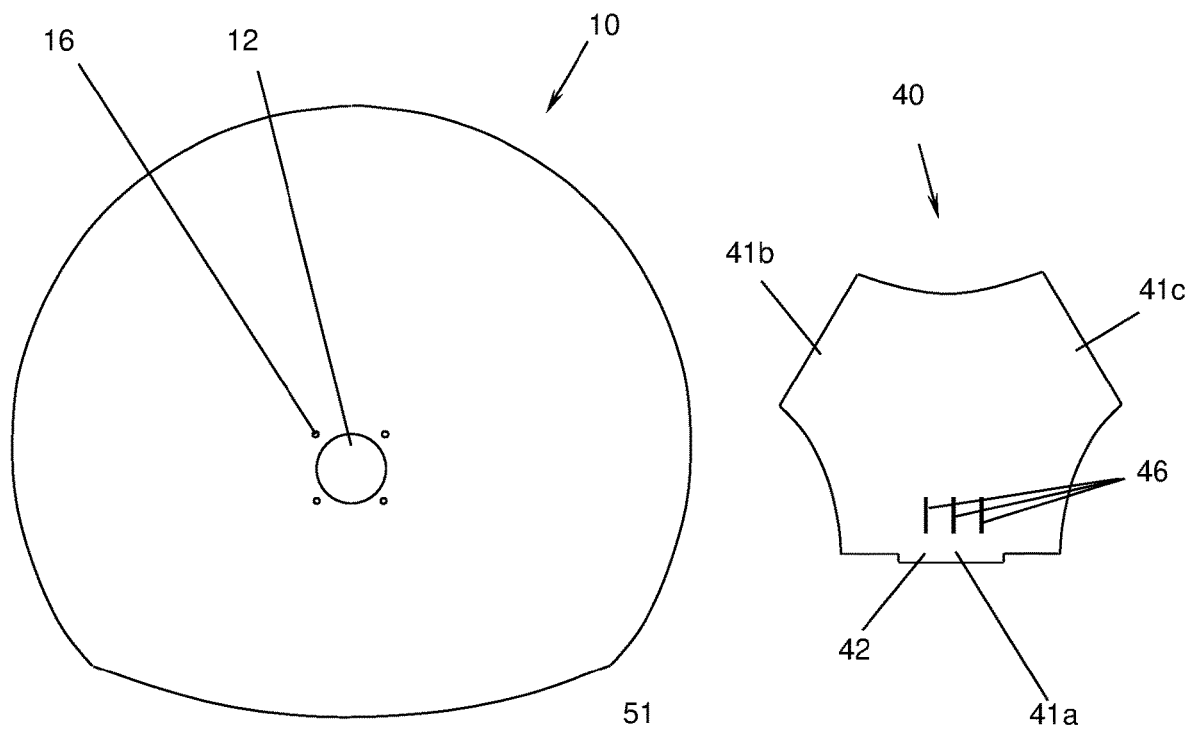
Fig. 1
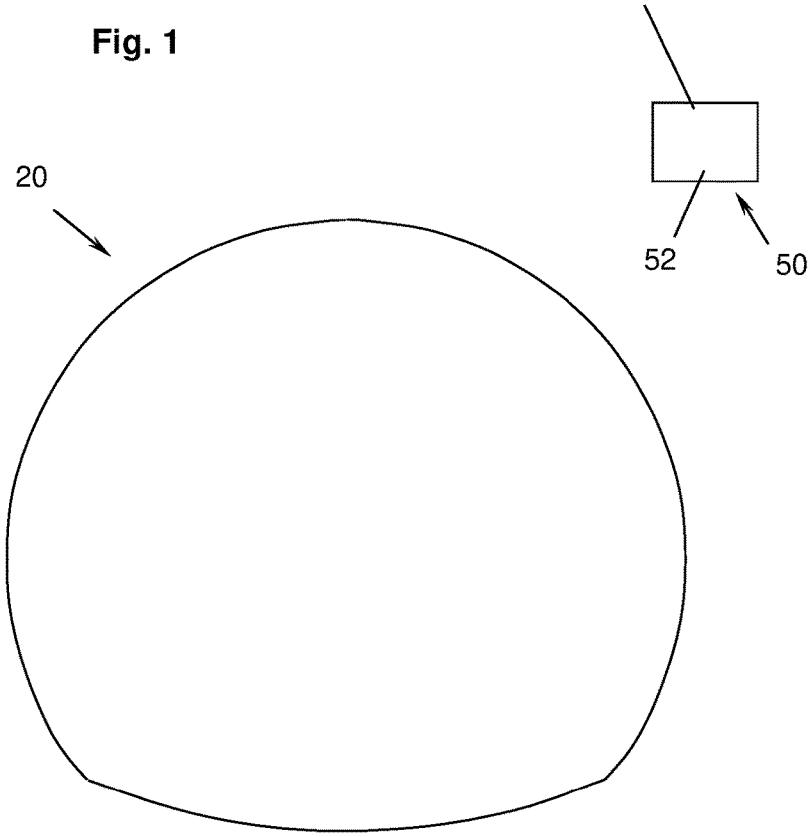
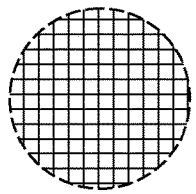
Fig. 1a
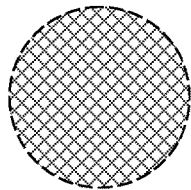
Fig. 1b

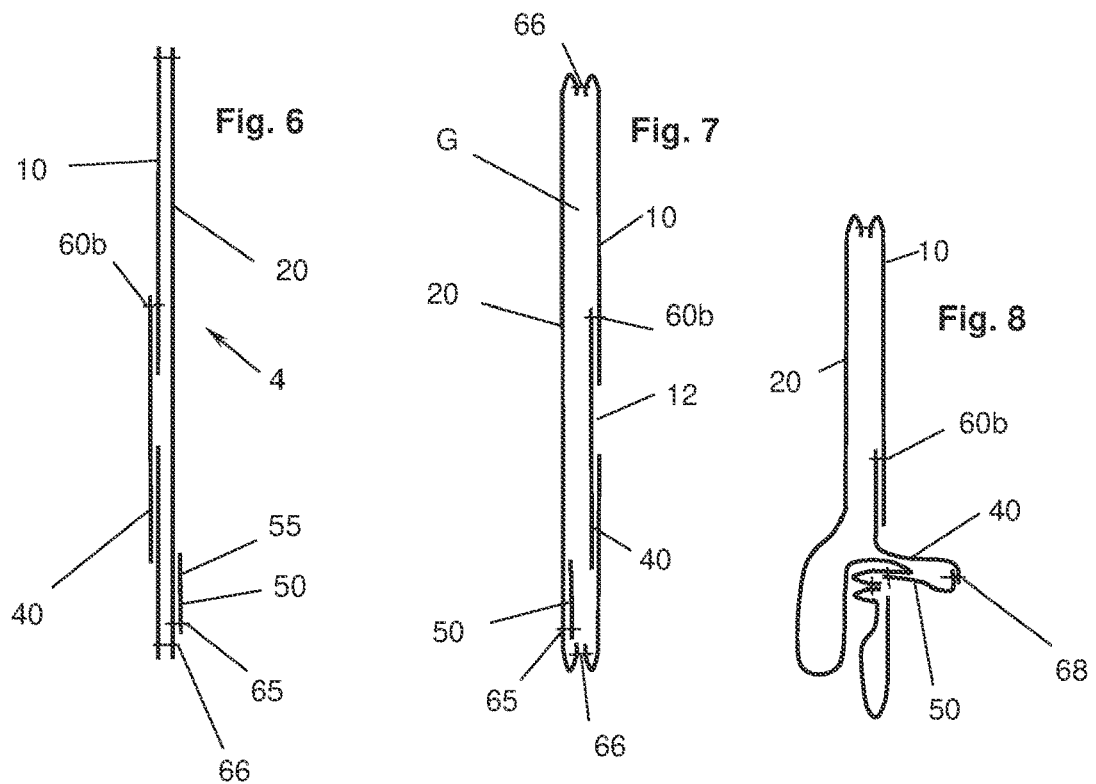
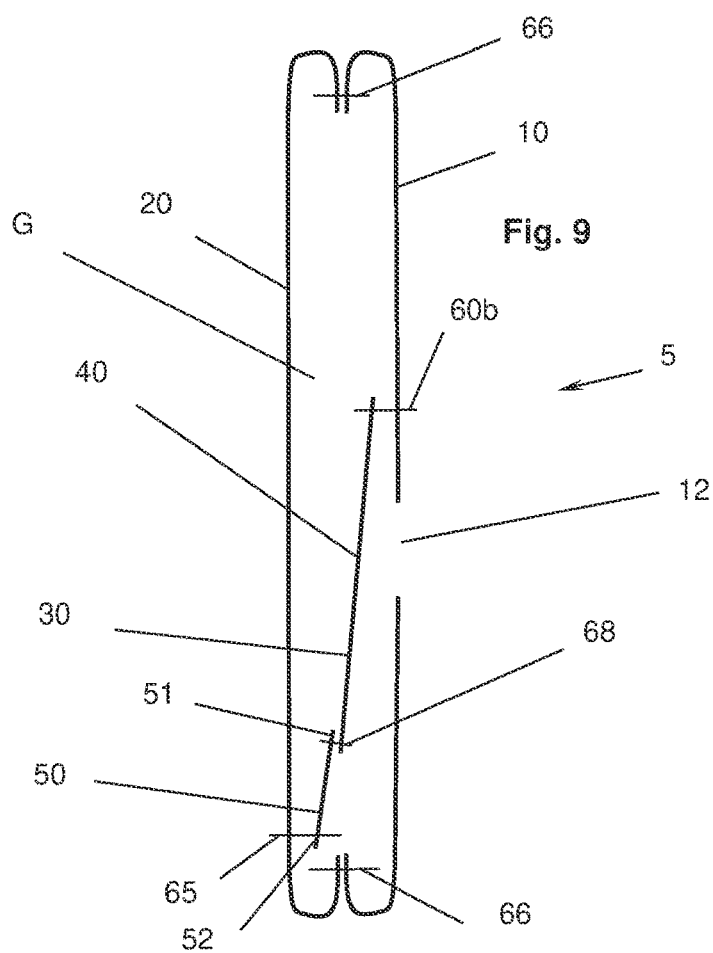

AIRBAG CUSHION WITH FLEXIBLE DIFFUSOR- AND TETHER ARRANGEMENT AND METHOD FOR ITS PRODUCTION

CROSS-REFERENCE TO RELATED APPLICATIONS

This application claims priority pursuant to 35 U.S.C. 119(a) to Germany Patent Application No. 102021103218.0, filed Feb. 11, 2021, which application is incorporated herein by reference in its entirety.

The invention relates to an airbag cushion comprising a back panel, a front panel and a flexible diffusor and tether arrangement and to a method for its production.

The invention especially relates to a frontal airbag cushion especially to a frontal driver airbag cushion. Such airbag cushions usually comprise a back panel and a front panel being connected to one another by means of a closed edge connection. Often, the back panel and the front panel have an identical outer contour and the back panel has an inflator opening for inserting the inflator. According to the definitions chosen in this application the front panel forms the impact layer facing the person to be protected when the airbag cushion is fully deployed, and the back panel forms the support layer which is for example supported by the steering wheel.

It is known in the art to provide a tether element between the back panel and the front panel which for example limits the maximum depth of the inflated airbag cushion and/or forms the deployed airbag cushion.

It is further known to provide a flexible diffusor element covering the inflator opening of the back panel in order to protect the cushion from the gases produced by the inflator and also to guide said gases within the cushion. This diffusor element can for example be made from the same kind of material as the back panel and the front panel. Using such a flexible diffusor element has many advantages, especially it is light weight and very cost effective.

From generic U.S. Pat. No. 8,925,962 B2 it is known to provide a combined diffusor- and tether arrangement which comprises a diffusor spanning over the inflator opening and two tethers extending from the back panel to the front panel. These tethers are connected to the back panel by means of seams that are also used to connect the diffusor to the back panel.

Using such a combined diffusor- and tether arrangement has for example the advantage that the number of seams is reduced.

Starting from this prior art, it is an object of the invention to improve a generic airbag cushion, especially in such a way that it can be produced very easily. Further, the airbag cushion should of course have good deployment and protection properties and should be robust and reliable.

This task is solved by an airbag cushion having one or more of the features described herein. A preferred method for its manufacture is also defined herein.

According to the invention, the flexible diffusor- and tether arrangement comprises a diffusor section being connected to the pack panel and a tether section extending from the diffusor section to the front panel.

As is known from U.S. Pat. No. 8,925,962 B2, the diffusor section spans over the inflator opening and is connected with the back panel via a back panel connection (usually a seam). This back panel connection has a first end point and a second end point, such that the diffusor section has a first outlet region extending between the first end point and the second end point and the back panel also has a first outlet region extending between the first end point and the second end point, such that a first gas outlet is formed between the first outlet region of the diffusor section and the first outlet region of the back panel.

According to the invention, the tether section extends from a first end region being connected to the diffusor section to a second end region being connected to the front panel. So, a combined flexible diffusor- and tether elements is formed in such a way that the diffusor element also has a tethering function. Several advantages result from the inventive structure of the diffusor- and tether element. The advantages concern the behavior and robustness of the airbag cushion as well as the manufacturing process.

Preferably, the tether section extends from an outlet region of the diffusor section.

One key advantage is that the force that is exerted from the front panel via the diffusor and tether element into the back panel is distributed over a large area. This reduces the risk of the breakage of a connection (usually the connections are in the form of seams).

In order to add some elasticity to the diffusor section, at least one opening, especially in the form of a slit pointing towards the tether section, can be provided in the diffusor section adjacent to the tether section. This reduces force peaks when the airbag cushion deploys and thus reduces the risk of breakage.

Often it will be preferred that the first outlet region of the diffusor section is arranged symmetrically relative to a middle axis of the back panel, especially in the 6-o'-clock-position. Especially in this case it is often sufficient to provide only one tether section with a relatively large width, so that it also has a gas-guiding function and directs a part of the gas towards the 6-o'-clock-position of the airbag cushion between the lower section of the rim of the steering wheel and the driver's abdomen, so that this part of the airbag cushion is deployed at an early stage of the deployment process.

In order to ease the manufacturing process—especially in the case that the edges of the front panel and the back panel point to the inside of the airbag cushion-, it is preferred that the diffusor section consists of a diffusor element and the tether section consists of a tether element that are connected to one another via an inner element connection. In this case, this inner element connection is preferably applied in a late assembly step in the manufacturing process of the airbag cushion.

According to current knowledge, it is preferred to sew the tether element to the diffusor element. In order to ease the sewing process, the diffusor element preferably comprises a protruding area to which the tether element is sewn.

As has just been mentioned, it is often preferred that edges of the back panel and the front panel point to the inside. This make an inside-out-turning necessary after the edge connection has been applied. In order to make it possible that this inside-out-turning is the last production step, it is preferred that the diffusor element (and thus the diffusor section) shows a central hole in front of the diffusor opening of the back panel such that the final inside-out-turning takes place through this central hole and through the inflator opening.

The robustness of the tether element can be increased by cutting the tether element such that warp- and weft-threads are slanted to the force transmitting direction, preferably by 45°.

It is possible to additionally provide a central tether extending between the diffusor section and the front panel. In order to make an easy assembly possible, this central tether should also comprise two elements.

BRIEF DESCRIPTION OF THE DRAWINGS

The invention will now be described in detail by means of a preferred embodiment in view of the figures. The figures show:

FIG. 1 the main cutting of a first embodiment of the inventive airbag cushion in a non-assembled state, FIG. 1a the weaving direction of the diffusor element, FIG. 1b the weaving direction of the tether element, FIG. 2 the back panel and the diffusor element as shown in FIG. 1 after the diffusor element has been sewn to the back panel, FIG. 3 the front panel and the tether element shown in FIG. 1 after the tether element has been sewn to the front panel, FIG. 4 the items shown in FIG. 2 after the back panel has been turned around, FIG. 5 the items shown in FIGS. 3 and 4 after the front panel has been placed onto the back and an edge seam connecting those two panels has been applied, so that a precursor of the airbag cushion has been formed, FIG. 6 a sectional view taken along plane A-A in FIG. 5, FIG. 7 the precursor of FIG. 6 after it has been turned inside out, FIG. 8 what is shown in FIG. 7 after the diffusor element and the tether element have been pulled through the inflator opening and an inner element seam has been applied, FIG. 9 the completely assembled airbag cushion in a representation according to FIG. 7, FIG. 10 the diffusor element of a second embodiment of the invention, FIG. 11 the diffusor element of FIG. 10 being sewn to the back panel, FIG. 12 the precursor of the second embodiment of the invention in a representation according to FIG. 6, FIG. 13 what is shown in FIG. 12 after the diffusor element and the tether element have been sewn together by the inner element connection seam in order to form the diffusor- and tether element, FIG. 14 what is shown in FIG. 13 after turning the airbag cushion inside-out, such that the completely manufactured airbag cushion is shown, FIG. 15 the main elements of a third embodiment of the inventive airbag cushion in a representation according to FIG. 1, FIG. 16 the diffusor element and the back-side element of a central tether after the back-side element of the central tether has been sewn to the diffusor element, FIG. 17 the items shown in FIG. 16 after the diffusor element has been sewn to the back panel, and FIG. 18 the front-side element of the central tether and the tether element sewn to the front panel.

DETAILED DESCRIPTION OF THE INVENTION

Figure 2:
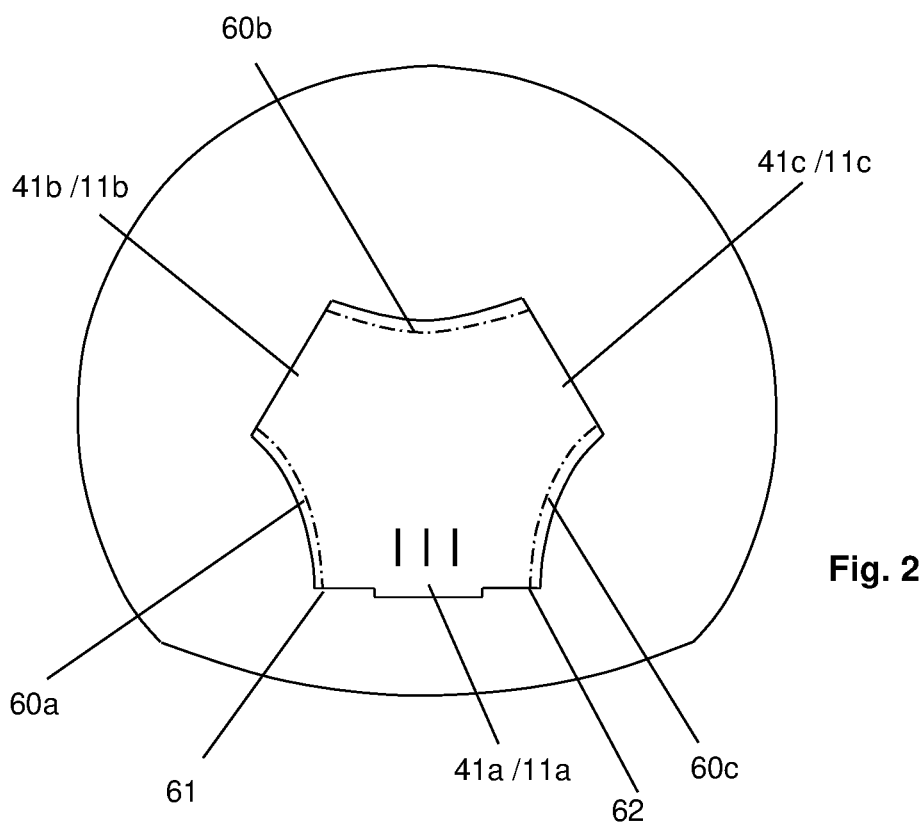

FIG. 1 shows all elements (except seams) of the described embodiment. These elements are four cuttings which usually consist of typical airbag material, especially of woven plastic material. All elements could be made from the same kind of material and this is preferred in most cases. The four cuttings are the minimum of cuttings needed for this embodiment, but of course more cuttings, for example for forming reinforcement layers, could be provided.

The airbag cushion of the described embodiment is a frontal driver airbag cushion, but an airbag cushion having the features of this invention could also form another kind of airbag cushion, especially a passenger frontal airbag cushion. The airbag cushion of the first embodiment only has one tethering connection between the back panel and the front panel. But of course, additional tethering elements could be provided without leaving the scope of this invention and an example with an additional tether is described later.

As has already been mentioned, FIG. 1 shows the main cuttings of the described embodiment. These cuttings are: a back panel 10, a front panel 20, a diffusor element 40 and a tether element 50. All these cuttings are flat, flexible elements.

The outer contours of the back panel 10 and the front panel 20 are congruent and the only difference between those two panels is that the back panel 10 shows an inflator opening 12 and in most cases also holes 16 for inflator studs around the inflator opening 12. The inflator opening 12 is a mandatory feature; the holes 16 for inflator studs are optional. In the shown embodiment, the inflator opening 12 is a circular hole but other shapes including a slit or several slits or slits extending from a hole are also possible. The back panel 12 and the front panel 20 are basically circular from about the eight o'clock-position to the four o'clock-position and flattened in-between such that the mounted and deployed airbag cushion (which is usually mounted to a steering wheel) does not extend too far towards the abdominal region of the driver.

The diffusor element 40 of the embodiment shown has three outlet regions 41a-41c. The first outlet region 41a has a protruding area 42 which is preferred, since such a protruding area 42 eases the production process as will be seen later. Slits 46 are provided next to the protruding area 42 on order to provide some elasticity.

The tether element 50 has a basically rectangular contour and extends from a first end region 51 to a second end region 52. It could comprise holes or other marks to ease the positioning and ease the sewing process.

FIG. 1a shows schematically the orientation of the warp- and weft-threads of the diffusor element 40, FIG. 1b shows schematically the orientation of the warp- and weft-threads of the tether element 50. One sees that the orientation of the warp- and weft-threads of the tether element 50 is 45° relative to the direction defined by its extension from its first end region 51 to its second end region 52. The warp- and weft-threads of the diffusor element are orientated 45° to the warp- and weft-threads of the tether element. This gives to extra elasticity to the tether element and reduces force peaks when the airbag cushion deploys.

Figure 3:
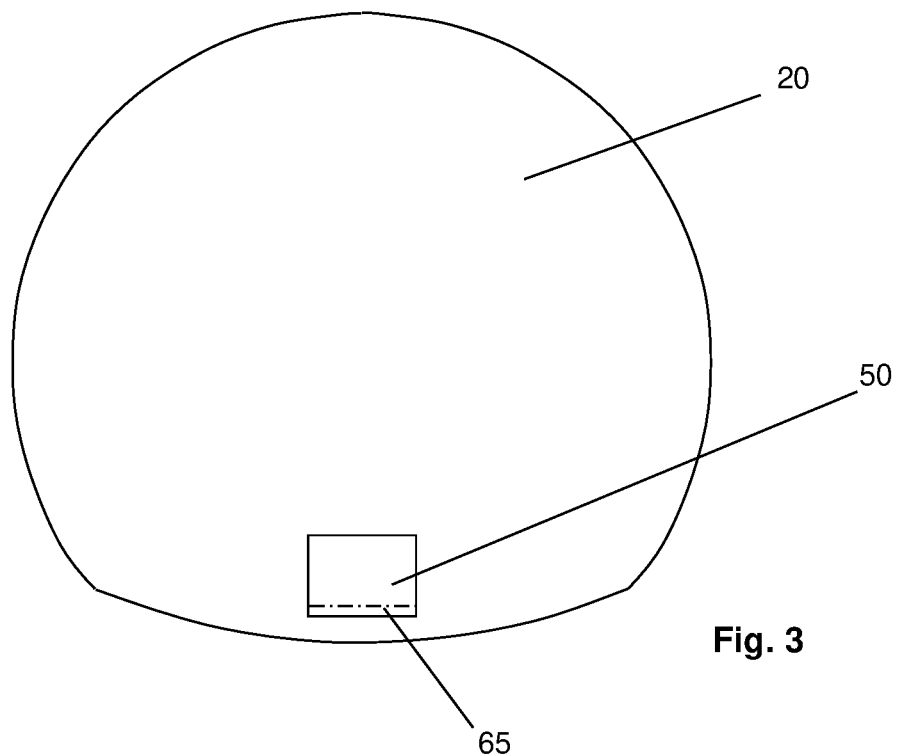
Figure 4:
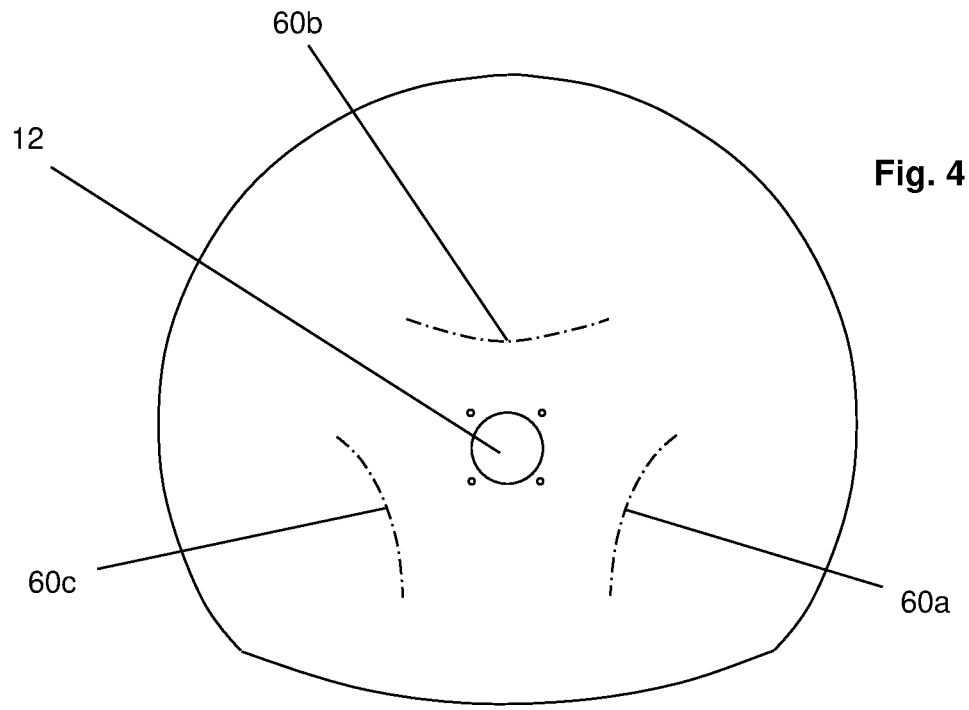

In first mounting steps, as are shown in FIGS. 2 and 3, the diffusor element 40 is sewn to the back panel 10 by means of a back panel connection in the form of a back panel seam. In this embodiment, this back panel seam has three seam sections 60a to 60c. According to the definition chosen herein, the back panel connection extends from a first end point 61 to a second end point 62. An outlet region of the diffusor element 40 and respectively a first outlet region of the back panel extends between those two end points 61, 62, such that a first gas outlet is formed between the back panel 10 and the diffusor element 40. Since the back panel seam has three sections, two more gas outlets are formed between the respective outlet regions of the diffusor element and the back panel.

Further, the tether element 50 is attached to the front panel 20 at the six o'clock position near the lower edge of the front panel 20 by means of a front panel connection in the form of a front panel seam 65 extending through the second end region 52 of the tether element 50 (FIG. 3).

Figure 5:
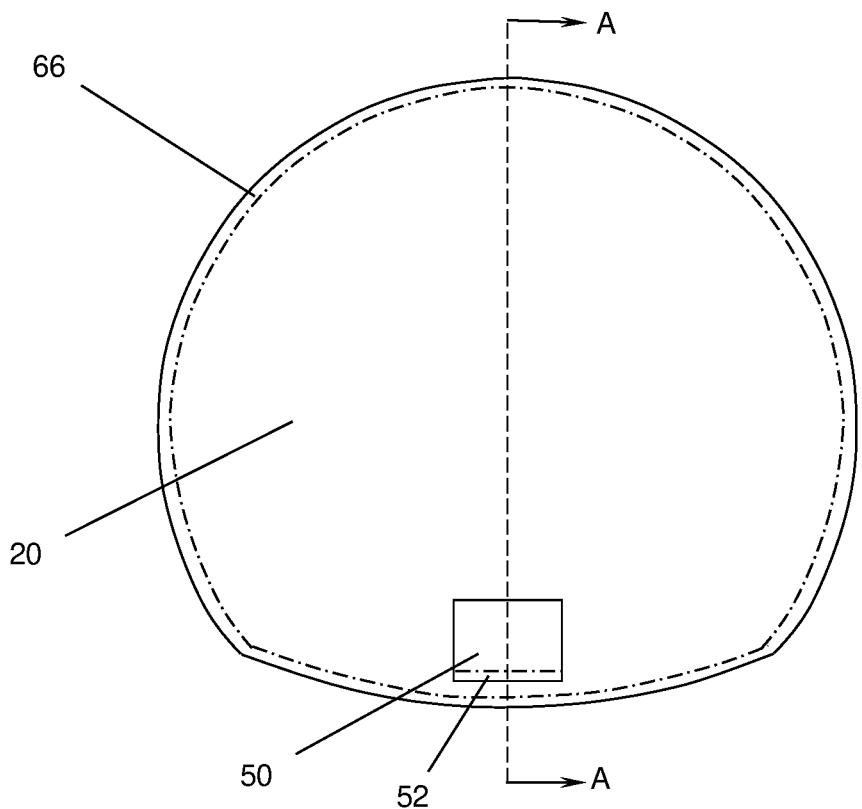
Figure 10:
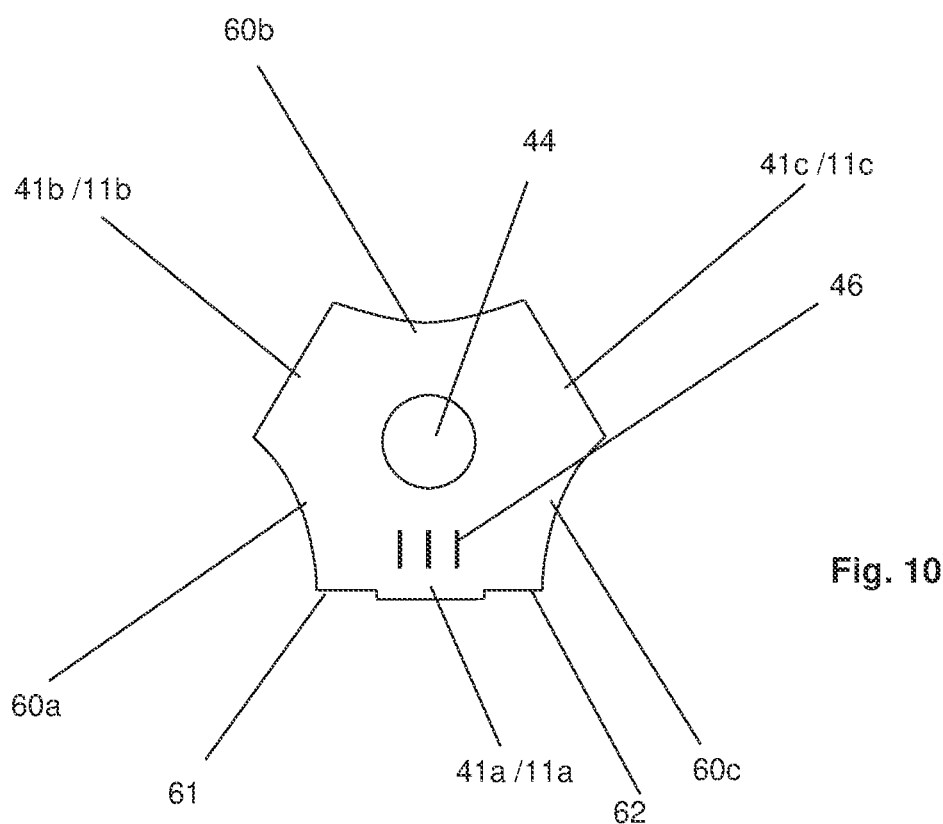

Next, the back panel 10 and the front panel 20 are congruently placed on one another in such a way that the surfaces to which the diffusor element 40 and the tether element 50 are attached are located on the outside meaning that the surface of the back panel 10 not carrying the diffusor element 40 and the surface of the front panel 20 not carrying the tether element 50 face each other. In this state an edge seam 66 forming a closed edge connection is applied. The outcome of this is shown in FIGS. 5 and 6. The airbag cushion is now in a preassembled state called precursor 4.

In a next step, this precursor 4 is turned inside out through the inflator opening 12 of the back panel 10 such that the edges of the back panel 10 and the front panel 20 point to the inside of the now formed gas space G of the airbag cushion and the diffusor element 40 and the tether element 50 are located on the inside, meaning inside this gas space G enclosed by the back panel 10 the front panel 20 which form the outer skin of the airbag cushion. This state is shown in FIG. 7.

Finally, the diffusor element 40 and the tether element 50 are pulled through the inflator opening 12 and are connected via an inner element connection in the form of an inner element connecting seam 68 extending through a part of the first outlet region 41a of the diffusor element 40, namely its protruding area 42, and through the first end region 51 of the tether element 50, such that now the diffusor element 40 and the tether element 50 are connected and form the diffusor— and tether element 30, wherein the diffusor element 40 forms its diffusor section 40 and the tether element 50 forms its tether section 50. It is preferred that the inner element connecting seam 68 is in the form of a shear seam meaning that the edges of the protruding area 42 and the first end region 51 point away from each other. The manufacturing process of the airbag cushion 5 is now completed; a schematic cross section of this airbag cushion 5 is shown in FIG. 9.

Figure 11:
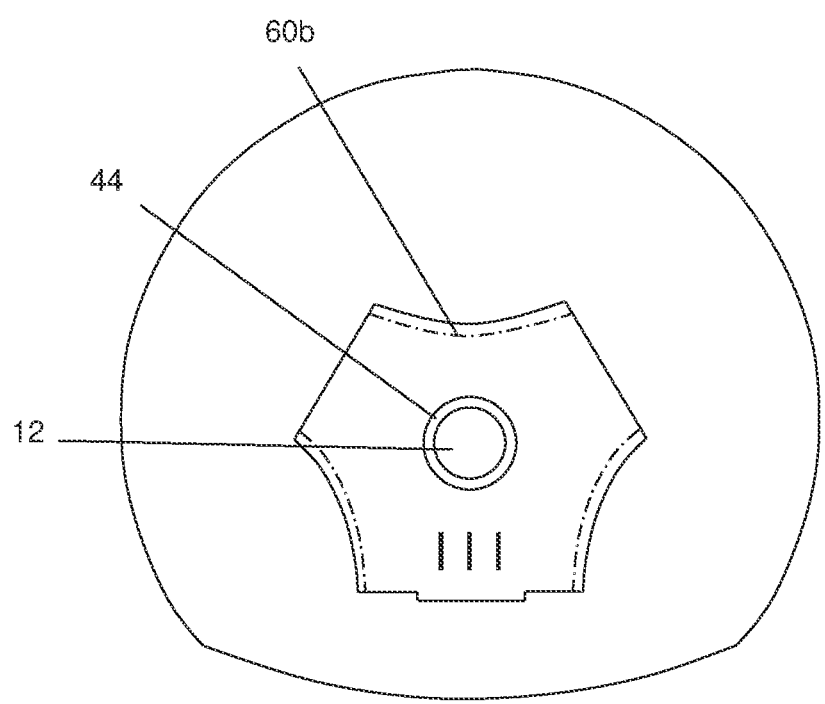
Figure 12:
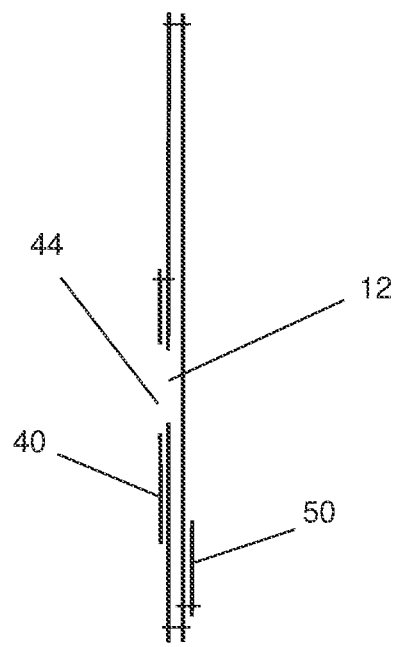
Figure 13:
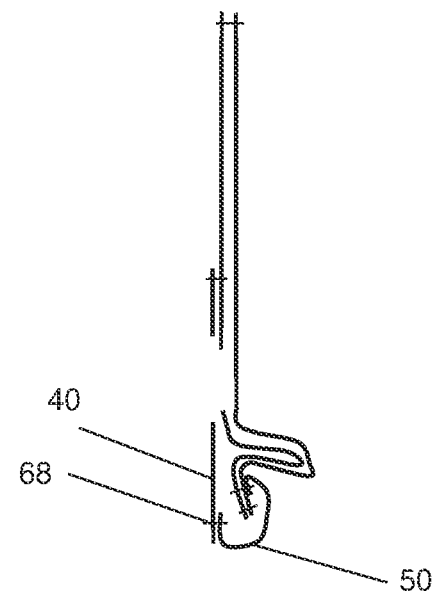
Figure 14:
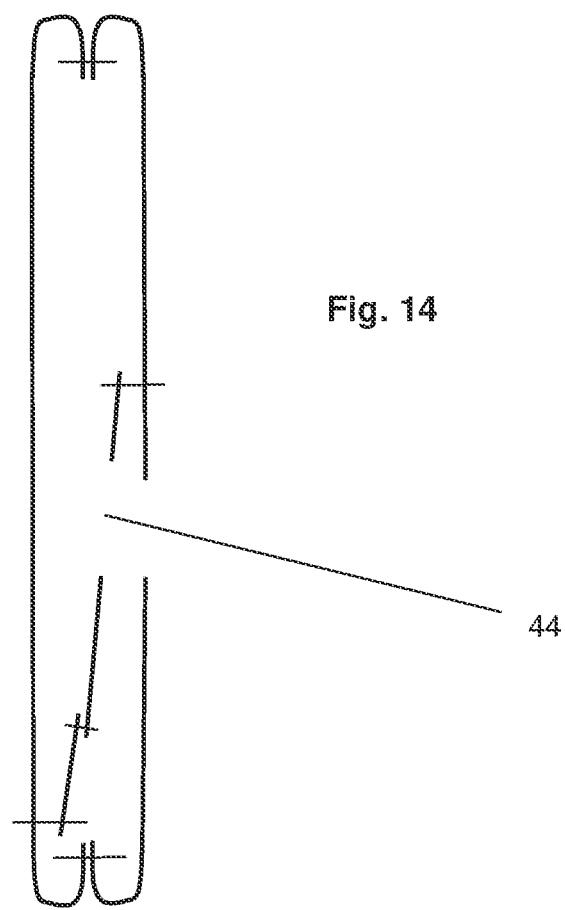

FIGS. 10 to 14 show a second embodiment. The difference to the first embodiment is that the diffusor element 40 shows a central hole 44 (FIG. 10) which is located in front of the inflator opening 12 when the diffusor element is sewn to the back panel 10 (FIGS. 11 and 12). This configuration makes it possible that the inner element connection seam 68 is applied before the airbag cushion is turned inside-out through the central hole 44 and the inflator opening 13 (FIGS. 13 and 14) which further eases the production process.

One sees that despite the fact that the diffusor section of the diffusor- and tether element covers a rather large surface of the back panel and the tether section of this diffusor tether element is connected to the front panel remote from the diffusor section, the airbag cushion is easy to manufacture.

Figure 15:
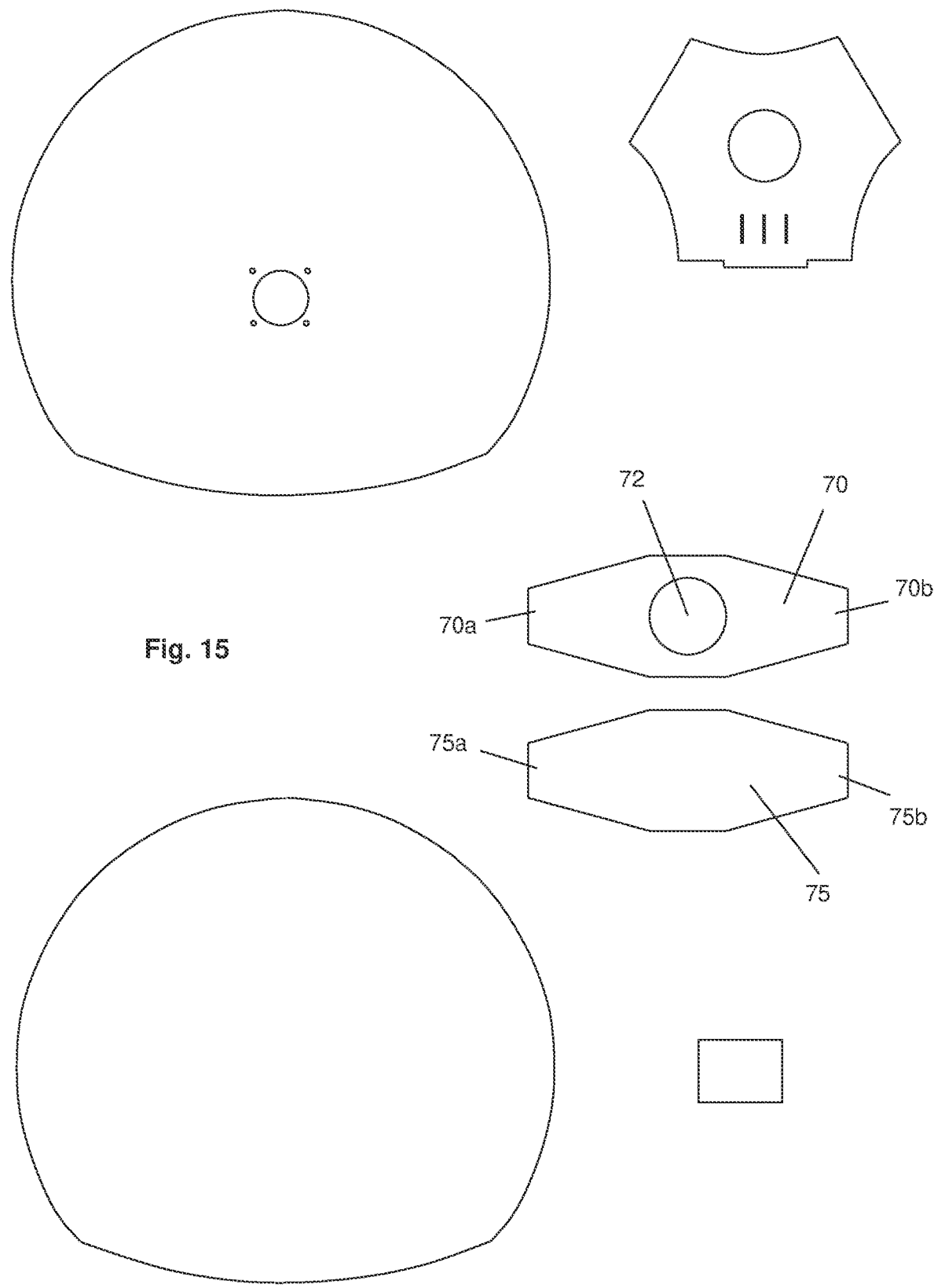
Figure 16:
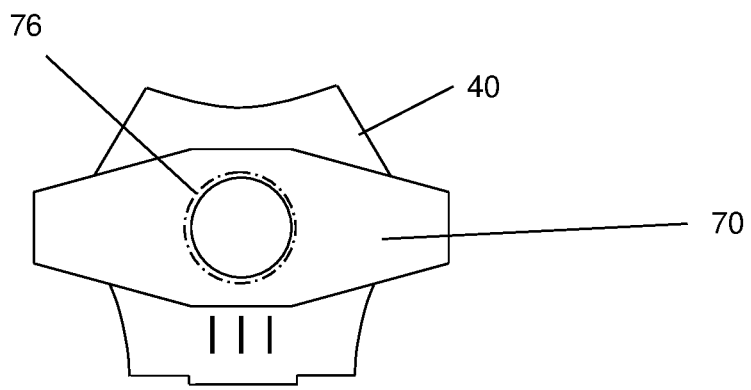
Figure 17:
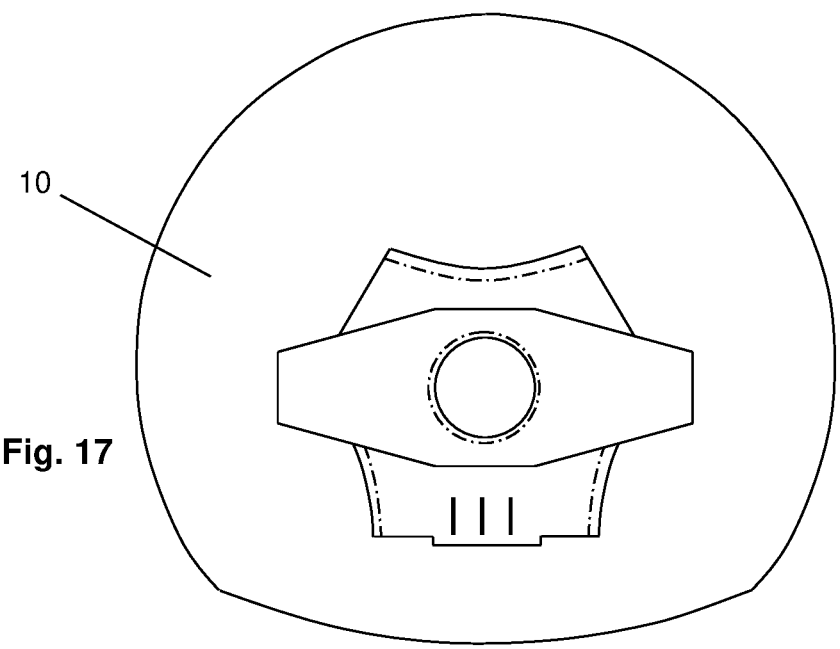
Figure 18:
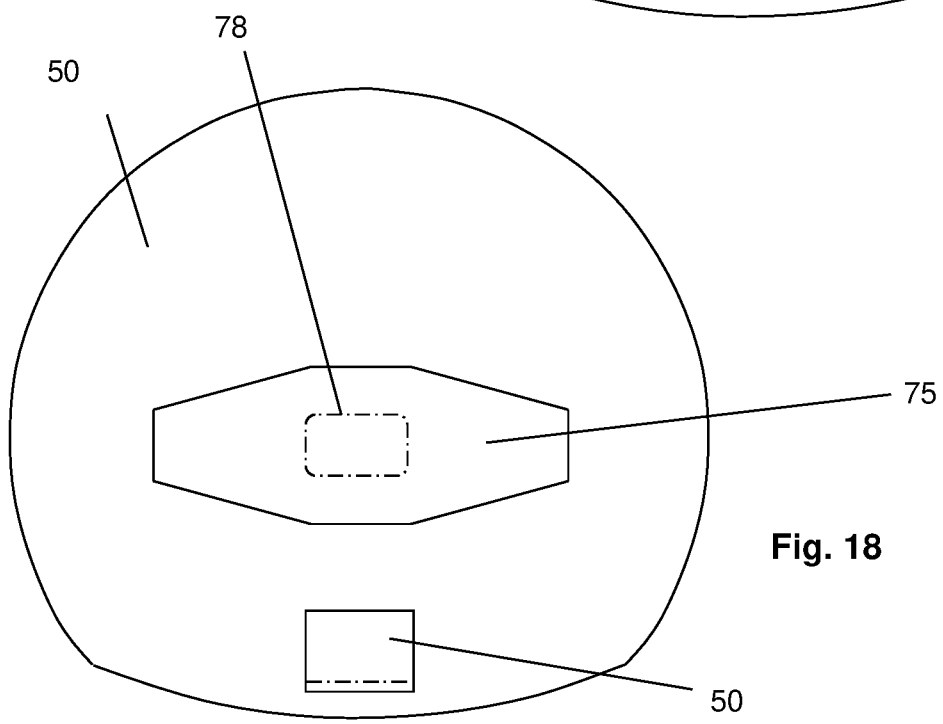

Often it is desired to limit the depth of the airbag cushion essentially in the center. In order to achieve this, the airbag cushion can additionally comprise a central tether. FIG. 15 shows the main elements of an embodiment (third embodiment) having such a central tether which comprises a back-side element 70 and a front-side element 75. The back-side element 70 has a central hole 72 such that the assembly method described above in view of the second embodiment can be applied. In relation to the second embodiment, the following additional sewing steps have to be carried out: Before the edge seam 66 is applied, the back-side element 70 of the central tether must be sewn to the diffusor element 40 by means of a rear central seam 76 (FIG. 16), the front-side element 75 of the central tether must be sewn to the front panel by means of a front central seam 78 (FIG. 18). After the edge seam 66 is applied, the lateral end region 70a of the back-side element 70 is sewn to the lateral end region 75a of the front-side element 75 and the lateral end region 70b of the back-side element 70 is sewn to the lateral end region 75b of the front-side element 75 (not shown). So, like in the second embodiment, the sewing process can be finished before the airbag cushion is turned inside-out.

LIST OF REFERENCE NUMBERS 4 precursor of airbag cushion
5 airbag cushion
10 back panel
11a-c outlet regions of back panel
12 inflator opening
16 holes for inflator studs
20 front panel
30 diffusor- and tether element
40 diffusor element, diffusor section
41a-c outlet regions of diffusor section
42 protruding area of first outlet region
44 central hole
46 slit
50 tether element, tether section
51 first end region
52 second end region
55 opening
60a-c sections of back panel seam (sections of back panel connection)
61 first end point of back panel connection
62 second end point of back panel connection
65 front panel seam (front panel connection)
66 edge seam
68 inner element connecting seam
70 back-side element of central tether
70a, b lateral end region of back-side element of central tether
72 central hole of back-side element of central tether
75 front-side element of central tether
75a, b lateral end region of front-side element of central tether
76 rear central seam
78 front central seam
G GAS SPACE

What is claimed is:

1. An airbag cushion comprising:
   a back panel having an inflator opening,
   a front panel being connected to the back panel by means of an edge connection,
   a flexible diffusor and tether arrangement comprising:
      a diffusor section spanning over the inflator opening and being connected with the back panel via a back panel connection having a first end point and a second end point, such that the diffusor section has a first outlet region extending between the first end point and the second end point and the back panel has a first outlet region extending between the first end point and the second end point, such that a first gas outlet is formed between the first outlet region of the diffusor section and the first outlet region of the back panel, the first gas outlet being configured to allow inflation gas to pass therethrough, and
      a tether section extending from a first end region being connected to the diffusor section to a second end region being connected to the front panel, wherein the first end region of the tether section extends directly from and is directly connected to the first outlet region of the diffusor section.

2. The airbag cushion of claim 1, wherein the first end region of the tether section is exclusively connected to the diffusor section, not to the back panel.

3. The airbag cushion of claim 1, wherein the second end region of the tether section is exclusively connected to the front panel, not to the back panel.

4. The airbag cushion of claim 1, wherein the diffusor section comprises at least one opening.

5. The airbag cushion of claim 1, wherein the back panel connection has at least two sections such that a second gas outlet is formed between the back panel and the diffusor section.

6. The airbag cushion of claim 5, wherein the first outlet region of the diffusor element comprises a protruding area through which the inner element connection extends, said protruding area having a length between 20 and 80 mm.

7. The airbag cushion of claim 1, wherein the diffusor section consists of a diffusor element, the tether section consists of a tether element and that the diffusor element and the tether element are connected to one another via an inner element connection.

8. The airbag cushion of claim 7, wherein the inner element connection is an inner element connecting seam.

9. The airbag cushion of claim 7, wherein the diffusor element and the tether element are both woven textile elements, wherein the weaving direction of the tether element is slanted relative to the weaving direction of the diffusor element.

10. A method for manufacturing the airbag cushion of claim 7 comprising the following steps:
   providing the front panel, the back panel, the diffusor element and the tether element,
   (ii) connecting the diffusor element to the back panel and the tether element to the front panel,
   (iii) connecting the front panel and the back panel via the edge connection in such a way that the diffusor element is located on the outside and the tether element is located on the outside, such that a precursor of the airbag cushion is formed,
   (iv) connecting the diffusor element and the tether element via the inner element connection, and
   (v) turning the precursor inside-out through the inflator opening and a central hole of the diffusor element.

11. The airbag cushion of claim 1, further comprising a central tether extending from the diffusor section to the front panel, said central tether comprising a back-side element and a front-side element.

12. The airbag cushion of claim 1, wherein the diffusor section has a central hole.

13. The airbag cushion of claim 1, wherein edges of the back panel and of the front panel point to the inside of the airbag cushion.

14. A method for manufacturing an airbag cushion, comprising the following steps:
   providing a back panel having an inflator opening, a front panel, a diffusor element, and a tether element;
   (ii) connecting the diffusor element to the back panel and the tether element to the front panel;
   (iii) connecting the front panel and the back panel via an edge connection in such a way that the diffusor element is located on the outside and the tether element is located on the outside, such that a precursor of the airbag cushion is formed;
   (iv) connecting the diffusor element and the tether element via an inner element connection; and
   (v) turning the precursor inside-out through the inflator opening and a central hole of the diffusor element.

* * * * *